(12) United States Patent
Iyoki

(10) Patent No.: US 7,383,328 B2
(45) Date of Patent: Jun. 3, 2008

(54) TERMINAL APPARATUS, NETWORK SYSTEM AND COMMUNICATION METHOD INCLUDING OPENING OF RECEIVED DOCUMENT FILE

(75) Inventor: Yutaka Iyoki, Kawasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 750 days.

(21) Appl. No.: 10/057,937

(22) Filed: Jan. 29, 2002

(65) Prior Publication Data

US 2002/0105681 A1 Aug. 8, 2002

(30) Foreign Application Priority Data

Feb. 2, 2001 (JP) ............... 2001-026745

(51) Int. Cl.
G06F 15/177 (2006.01)
G06F 15/173 (2006.01)
H04N 1/46 (2006.01)

(52) U.S. Cl. ............... 709/222; 709/223; 358/505

(58) Field of Classification Search ............ 709/201, 709/222, 223; 358/505
See application file for complete search history.

(56) References Cited

U.S. PATENT DOCUMENTS

| | | | | |
|---|---|---|---|---|
| 5,764,866 | A * | 6/1998 | Maniwa ............... | 358/1.15 |
| 5,877,963 | A * | 3/1999 | Leung et al. ............ | 700/223 |
| 5,911,044 | A * | 6/1999 | Lo et al. ............... | 709/203 |
| 6,223,223 | B1 * | 4/2001 | Kumpf et al. ........... | 709/227 |
| 6,256,662 | B1 | 7/2001 | Lo et al. | |
| 6,289,371 | B1 * | 9/2001 | Kumpf et al. ........... | 709/203 |
| 6,459,499 | B1 * | 10/2002 | Tomat ................ | 358/1.15 |
| 6,480,304 | B1 * | 11/2002 | Os et al. .............. | 358/474 |
| 6,504,626 | B1 * | 1/2003 | Shih ................. | 358/442 |
| 6,784,925 | B1 * | 8/2004 | Tomat et al. .......... | 348/207.11 |

(Continued)

FOREIGN PATENT DOCUMENTS

EP 0860978 8/1998

(Continued)

OTHER PUBLICATIONS

English Language Abstract of JP 10-275209.

(Continued)

*Primary Examiner*—William Vaughn
*Assistant Examiner*—Ranodhi N Serrao
(74) *Attorney, Agent, or Firm*—Greenblum & Bernstein, P.L.C.

(57) ABSTRACT

A terminal apparatus is configured to receive image data from a scanner. A controller receives, from the scanner, a control file including a file name, receives, from the scanner, a document file, the document file including image data scanned by the scanner, analyzes the file name included in the received control file to obtain the file type of the received document file, and determines whether the application program associated with the obtained file type is stored in a memory. The controller also searches the memory to determine the application program associated with the obtained file type from application programs stored in the memory, starts the application program associated with the obtained file type, when it is determined that the application program associated with the obtained file type is stored in the memory, and opens the received document file without user input, based upon the application program determined in the search.

21 Claims, 8 Drawing Sheets

U.S. PATENT DOCUMENTS

| | | | |
|---|---|---|---|
| 6,785,867 B2 * | 8/2004 | Shaffer et al. | 715/516 |
| 6,839,147 B1 * | 1/2005 | Umebayashi | 358/1.15 |
| 2001/0014908 A1 | 8/2001 | Lo et al. | |
| 2002/0004802 A1 * | 1/2002 | Shima | 707/513 |

FOREIGN PATENT DOCUMENTS

| | | |
|---|---|---|
| EP | 0989729 | 3/2000 |
| JP | 10-275209 | 10/1998 |
| JP | 11-120111 | 4/1999 |
| JP | 11-161457 | 6/1999 |
| JP | 11-232155 | 8/1999 |

OTHER PUBLICATIONS

English Language Abstract of JP 11-120111.
English Language Abstract of JP 11-161457.
English Language Abstract of JP 11-232155.
English Language Abstract of JP 10-275209, Oct. 13, 1998.
English Language Abstract of JP 11-120111, Apr. 30, 1999.
English Language Abstract of JP 11-161457, Jun. 18, 1999.
English Language Abstract of JP 11-232155, Aug. 27, 1999.

* cited by examiner

| EXTENSION | LINK APPLICATION | DISPLAY STATE |
|---|---|---|
| TIFF (tif,tiff) | TIFF VIEWER | NORMAL |
| GIFF (gif) | IMAGE EDITION SOFTWARE | THUMBNAIL DISPLAY |
| JPEG (jpg,jpeg) | WWW BROWSER | THUMBNAIL DISPLAY |
| BMP (bmp) | IMAGE EDITION SOFTWARE | THUMBNAIL DISPLAY |
| PDF (pdf) | PDF READER | NORMAL |
| TXT (txt) | TEXT EDITOR | NORMAL |

FIG. 7

TERMINAL APPARATUS, NETWORK SYSTEM AND COMMUNICATION METHOD INCLUDING OPENING OF RECEIVED DOCUMENT FILE

BACKGROUND OF THE INVENTION

1. Field of the Invention

The present invention relates to a network scanner and file transmitting/receiving system, and user terminal apparatus and file transmitting/receiving system.

2. Description of the Related Art

Conventionally, a scanner is positioned on a network and image information scanned by the scanner is transmitted to a desired personal computer (PC) connected to the network. Such a scanner is referred to as a network scanner.

The network scanner converts image information to a predetermined file format (for example, TIFF), establishes a communication channel between PC and the network scanner on the network using a TCP protocol, and transfers an image file to PC through this communication channel. PC stores this image file to a hard disk and the like, and performs display and edition based on an application (Viewer and the like).

For example, in displaying the image file transmitted and stored in PC, a user selects a viewer application corresponding to the image file from a launcher menu of an OS (Operation System) standard, and starts up it. Sequentially, the user selects a "file open" command from the menu of the viewer application, and executes it so as to open a holder in which image files are stored. Then, the user selects a desired image file and opens it.

In the image file, numerous formats exist, and applications corresponding to the respective formats also exist. For this reason, the user must select an application suitable for viewing and editing the image file.

Moreover, in the case of opening the image file from the application, it is required that the user should perform a plurality of operations such as selection of command, selection of folder and file, confirmation and execution and the like. This is not necessarily the simple and easy way to all users due to numerous operations.

OS has a function that associates the file with the application. However, in this case, there is a necessity to search the folder in which image files are stored from a directory using a filer of OS standard, select a desired image file therefrom, and click the selected image file.

Thus, in any case, the user must search a target image file from numerous image files scanned in the past by the unaided eye in order to view the image which the user has just scanned using the network scanner.

SUMMARY OF THE INVENTION

It is an object of the present invention is to provide a network scanner and file transmitting/receiving system that is capable of easily viewing an image scanned by the network scanner, and a user terminal apparatus and file transmitting/receiving system.

In order to attain the above object, the present invention provides a network scanner, file transmitting/receiving system that transmits a document file obtained by scanning a document by use of the network scanner to a user terminal apparatus via a network. When the user terminal apparatus receives the document file, the user terminal apparatus automatically starts up an external application, which corresponds to a document file to display the document file.

This makes it possible for the user terminal apparatus to automatically start up the external application so as to display the content of the document file when the user instructs the network scanner to scan the document and the document file is transmitted to the user terminal apparatus. Resultantly, the user can view the document file immediately after the user returns to the user terminal apparatus.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 7 is a view illustrating one example of an external application managing table to which the external application startup program on the personal computer of the above embodiment refers;

DETAILED DESCRIPTION OF THE PREFERRED EMBODIMENTS

A preferred embodiment will be specifically described with reference to the drawings accompanying herewith.

Figure 1:
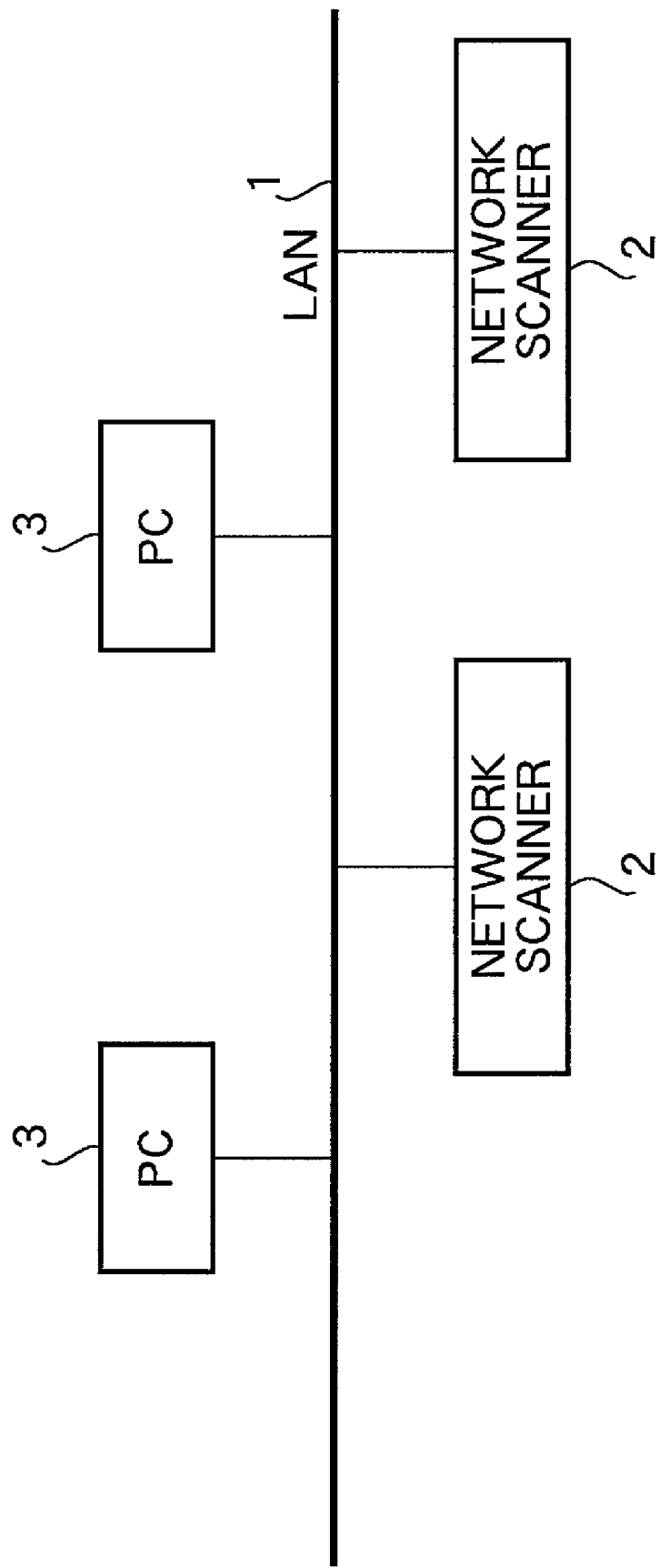
FIG. 1 is a schematic view illustrating a network system where a network scanner operates according to the embodiment of the present invention.

FIG. 1 is a schematic view illustrating a network system where a network scanner operates according to the embodiment of the present invention.

A plurality of network scanners 2 and a plurality of PCs 3, which are user terminals each using the network scanner 2, are connected to LAN 1. It should be noted that the LAN 1 is not particularly limited and the Internet, WAN, and the like are included. In this system, the network scanner 2 converts image information scanned by the network scanner 2 to a predetermined image file and specifies an arbitrary PC3 to transmit the image file to PC3 via LAN 1. PC3 stores the received image file and automatically executes an external application appropriate to the image file so as to display image information. The following will specifically explain this system.

Figure 2:
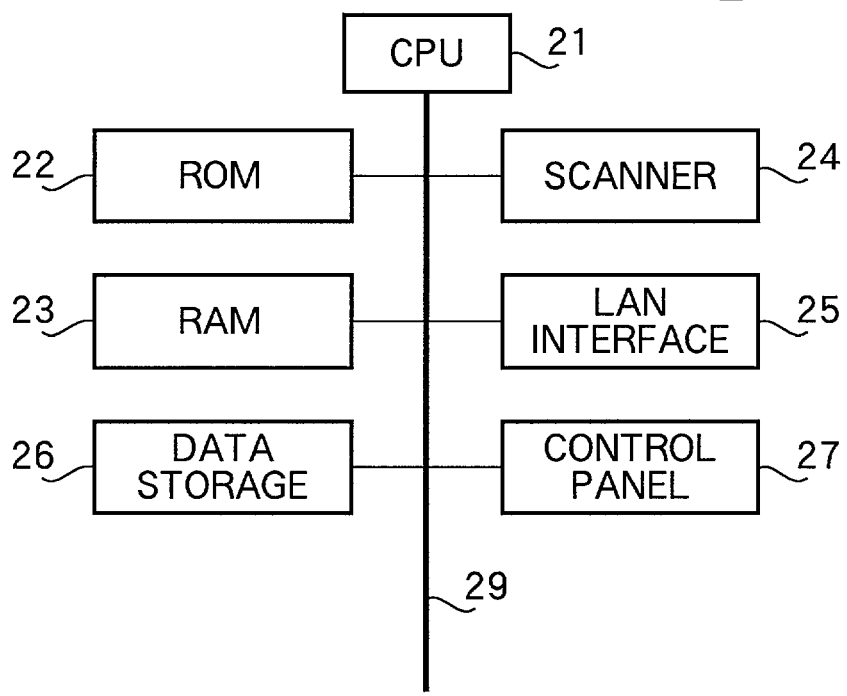
FIG. 2 is a block diagram illustrating the hardware configuration of a network scanner according to the above embodiment.

FIG. 2 is a block diagram illustrating the hardware configuration of the network scanner according to the above embodiment.

The network scanner 2 includes CPU 21, ROM 22, RAM 23, scanner 24, LAN interface 25, data storage 26, and control panel 27. In this embodiment, the respective devices 22 to 27 are controllably connected to CPU 21 via a system bus 29, but the present invention is not limited to this. Here, as the storage 26, a hard disk or a flush memory device may be used. Moreover, the control panel 27 is used to read an IP address of a transmission destination from address notebook data or manually input the IP address in an unregistered case.

Figure 3:
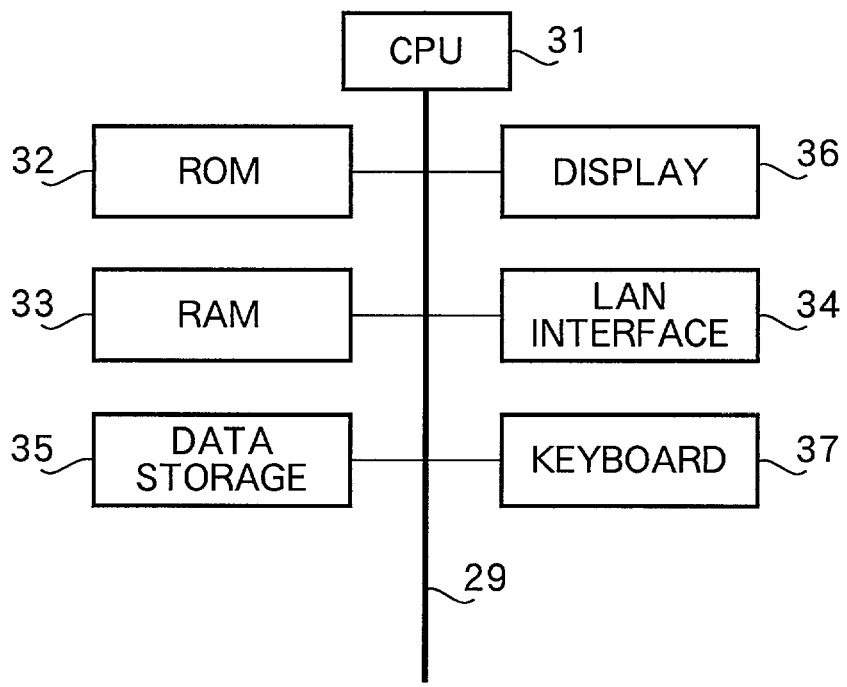
FIG. 3 is a block diagram illustrating the hardware configuration of a personal computer according to the above embodiment.

FIG. 3 is a block diagram illustrating the hardware configuration of a personal computer according to the above embodiment. PC3 includes CPU 31, ROM 32, RAM 33, LAN interface 34, data storage 35, display 36, and keyboard 37. Input means such as keyboard 37 is an arbitrary configuration, and the present invention is not limited to this.

Figure 4:
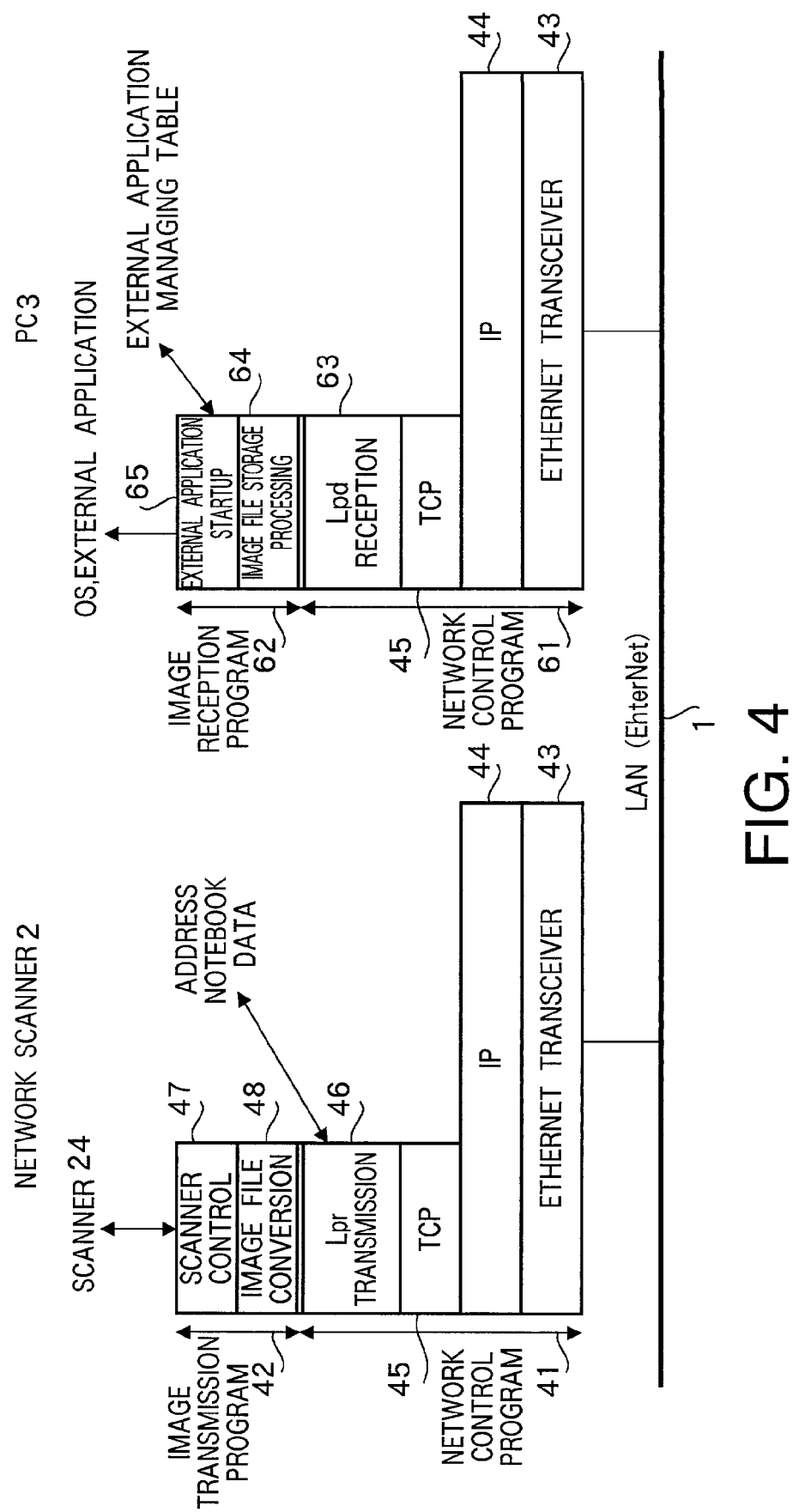
FIG. 4 is a block diagram illustrating a network configuration between the network scanner and the personal computer according to the above embodiment.

FIG. 4 is a block diagram illustrating a network configuration between the network scanner and the personal computer according to the above embodiment.

In the network scanner 2, the program executed by CPU 21 is largely divided into a network control program 41 and an image transmission program 42. The network control program 41 performs control necessary to transmit/received data to/from PC3 on LAN 1 (Ethernet). The network control program 41 includes a TCP program 45 executed based on an Ethernet transceiver 43 and an IP program 44. The network control program 41 further includes an Lpr transmission program 46 that is used to transmit a TIFF file to PC3 based on an Lpr/Lpd protocol by use of the TCP program 45.

On the other hand, the image transmission program 42 handles data to be transmitted/received by use of the foregoing network control program 41. The image transmission program 42 is composed of a scanner control program 47 and an image file converting program 48. The scanner control program 47 controls the scanner 24 illustrated in FIG. 2, and scans a document so as to obtain bitmap data. The image file converting program 48 converts bitmap data to an image file. A data format of the image file may be, for example, TIFF, GIF, JPEG and the like, and TIFF is used in this example.

Similarly, in PC3, the program executed by CPU 31 is largely divided into a network control program 61 and an image reception program 62. Similar to the network scanner 2, the network control program 61 includes the Ethernet transceiver 43, IP program 44, and TCP program 45. The network control program 61 further includes further includes an Lpd reception program 63 that is used to receive the TIFF file from the network scanner 2 based on the Lpr/Lpd protocol by use of the TCP program 45.

The image reception program 62 is composed of an image file storage processing program 64 and an external application startup program 65. The image file storage processing program 64 stores the image file received via the Lpd reception program 63 to the data storage 26 shown in FIG. 2. Moreover, the external application startup program 65 starts up an external application, which is appropriate to process the received image file.

The external application refers to an application, which is installed on PC3 independently of the image reception program 62 and which does not necessarily have the function specified to perform communication with the network scanner 2. The external application includes various kinds of applications such as dedicated software for viewing an image such as TIFF viewer, an image edition software that is capable of not only viewing but also editing an image, other software that is capable of displaying an image, applications such as WWW browser, word processor, database, and the like.

In contrast to this, the image reception program 62 always has the function specified to perform communication with the network scanner 2. For example, at the time of starting up OS, the image reception program 62 stays resident and waits for a request for receiving an image file from the network scanner 2. Then, the image reception is program 62 launches the external application corresponding to the image file.

The Lpr/Lpd protocol used in communication between the network scanner 2 and PC3 is a communication protocol, which is used to transmit/receive print data between hosts using UNIX as OS. In this Lpr/Lpd protocol, the host, which wishes to receive print service, outputs a request to a line printer daemon (Lpd), which is executed on a certain host. The daemon, which has received the request, accepts it as a job, and queues it to perform processing.

Figure 5:
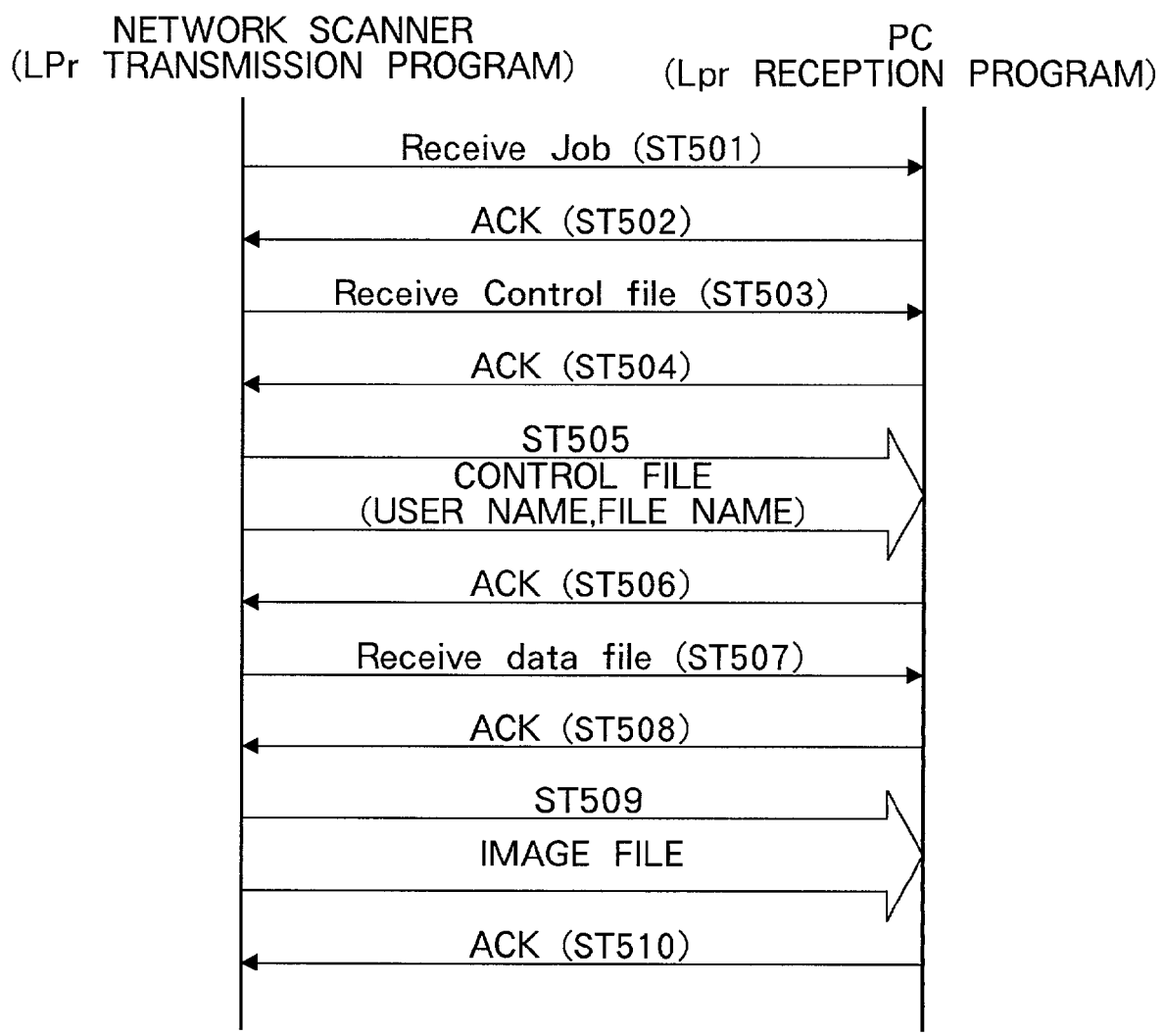
FIG. 5 is a sequence view illustrating an image file transfer between the network scanner and the personal computer according to the above embodiment.

FIG. 5 is a sequence view illustrating an image file transfer carried out between the network scanner and the personal computer according to the above embodiment.

As illustrated in FIG. 5, the Lpr transmission program 46 of the network scanner 2 transmits a command "Received Job" instructing the reception of job to the Lpd reception program 63 of PC3 (ST501). In response to this, if the Lpd reception program 63 of PC3 sends back ACK to the Lpr transmission program 46 (ST502), the Lpr transmission program 46 transmits a sub-command "Receive control file" instructing the reception of control file to the Lpd reception program 63 (ST503). This sub-command includes the size of control file and the name of control file name.

In response to this, if the Lpd reception program 63 sends back ACK (ST504) to the Lpr transmission program 46, the Lpr transmission program 46 transmits the control file to the Lpd reception program 63 (ST505). This control file includes a user name, a file name of image file, and the like.

Next, if the Lpd reception program 63 completes the reception of control file and sends back ACK to the Lpr transmission program 46 (ST506), the Lpr transmission program 46 transmits a sub-command "Receive data file" representing the transmission of image file to the Lpd reception program 63 (ST507). If the Lpr transmission program 46 confirms that the Lpd reception program 63 has sent back ACK to the Lpr transmission program 46 (ST508), the Lpr transmission program 46 transmits an image file to the Lpd reception program 63 (ST509). If the reception of image file is completed, the Lpd reception program 63 sends back ACK to the Lpr transmission program 46 (ST510).

Since the foregoing Lpr/Lpd protocol used in the image file transfer is based on TCP, the transmission/reception of command, sub-command, control file and data file is carried out on not a packet-by-packet basis but a stream-by-stream basis. In other words, connection between the network scanner 2 and PC3 is established and then communication is carried out. Such a connection is referred to as a TPC communication channel.

Figure 6:
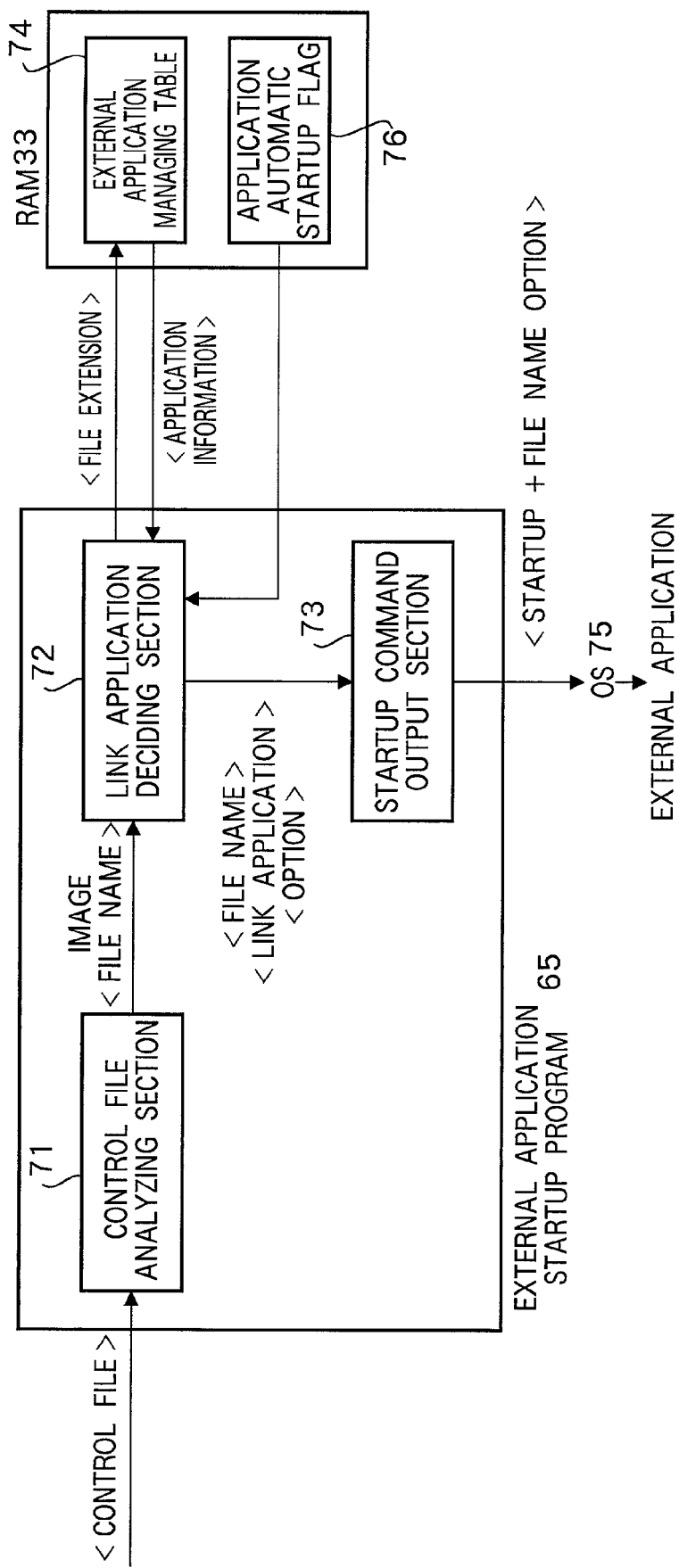
FIG. 6 is a block diagram illustrating the functions of an external application startup program that is operated by the personal computer according to the above embodiment.

FIG. 6 is a block diagram illustrating the functions of an external application startup program that is operated by the personal computer according to the above embodiment.

An external application startup program 65 is composed of a control file analyzing section 71, a link application deciding section 72, and a startup command output section 73. The control file analyzing section 71 analyzes the control file transmitted from the network scanner 2, identifies an image file name therefrom, and notifies the link application deciding section 72 of the identified name as file information.

The link application deciding section 72 identifies an extension of the image file from this image file name, and searches an external application managing table 74 in RAM 33 based on the extension.

FIG. 7 is a view illustrating one example of an external application managing table to which the external application startup program on the personal computer of the above embodiment refers. The external application managing table 74 stores extensions 81 of image files (TIFF, GIFF, JPEG, BMP), external applications 82 (hereinafter referred to link applications) associated with the kinds of image files, and a display state 83, which is shown at the application startup time such that they are related to one another. The link application deciding section 72 obtains the link application 82 and the display state 83 (hereinafter referred to as application information) using the extension 81 as a key. The link application deciding section 72 decides the link application and an option used at the link application startup time based on this application information, and sends then to the startup command output section 73 together with the image file name.

The startup command output section 73 generates a startup command of the link application using the file name of image file and the option as arguments, and outputs it to an OS 75. Accordingly, the OS 75 starts up the external application according to the startup command, and executes the external application.

Figure 8:
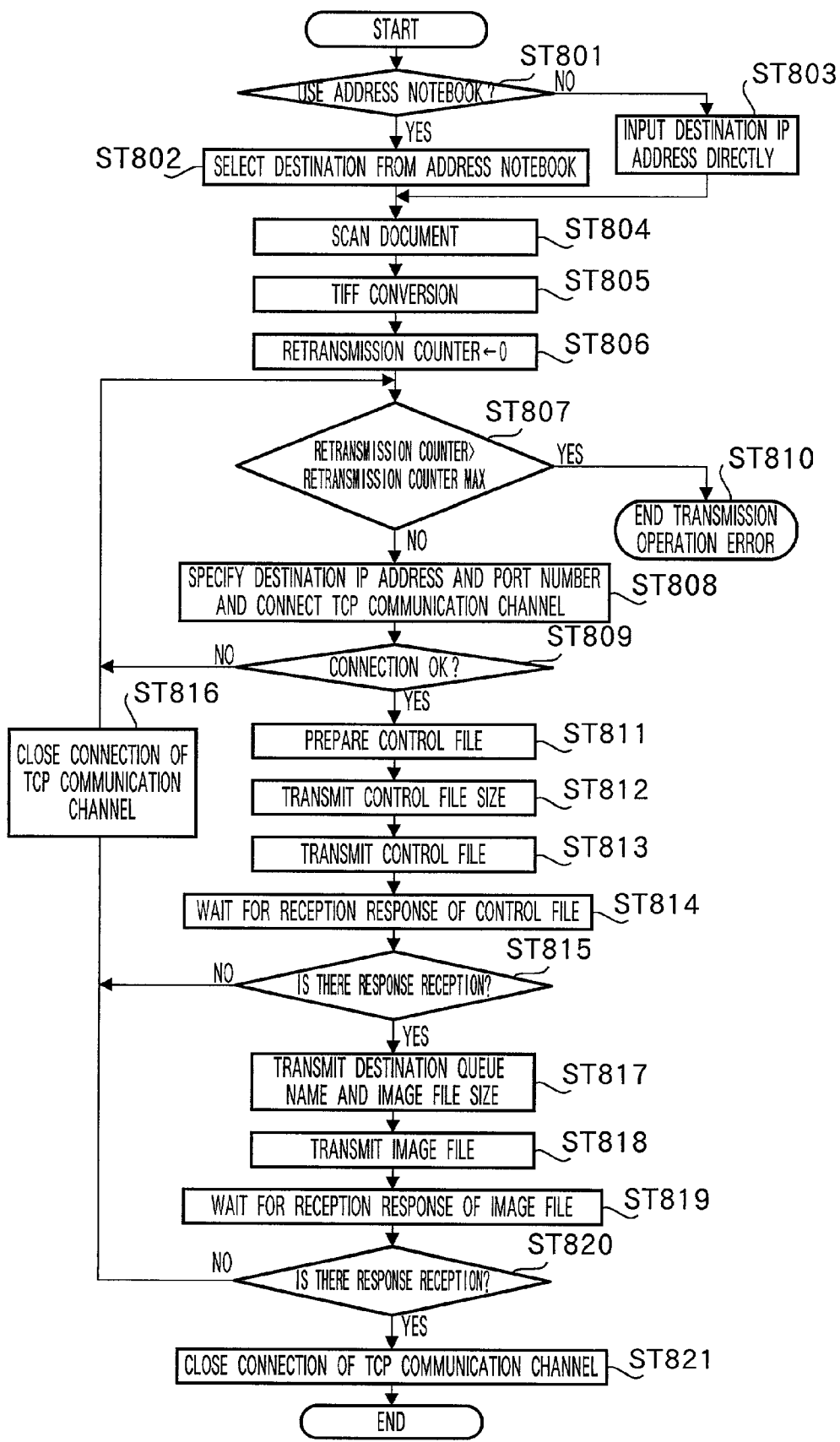
FIG. 8 is a flowchart illustrating an image file transmitting operations carried out by the network scanner according to the above embodiment.

FIG. 8 is a flowchart illustrating an image file transmitting operations carried out by the network scanner according to the above embodiment.

First, the network scanner 2 selects whether or not address notebook data is used in order to specify a transmission destination of image file (ST801). The network scanner 2 carries out this selection by selecting an address notebook menu from menus. In the case where the use of address notebook data is selected in ST801 (YES), for example, the network scanner 2 displays the user name registered to address notebook data on an LCD provided at the control panel 27 in the form of list, and instructs the user to select the user name form the list (ST802). If the user name is selected, the IP address of PC3, which is registered to address notebook data to be associated with this user name, is called up, and is specified as a destination. This, of course, includes the case in which the destination is specified with a one-touch button. On the other hand, if the result is "NO" in ST801, the user receives the direct input of IP address of the destination using a key provided at the control panel section 27 (ST803) and processing goes to ST804.

In ST804, the scanner control program 47 of the network scanner 2 instructs the scanner 24 to scan the original so as to obtain bitmap data. Sequentially, the image file converting program 48 compresses bitmap data in a predetermined format (for example, facsimile data format such as MH, MMR and the like), and the image compressed file is converted to an image file with TIFF format (ST805).

When the preparation for the transmitting image file is thus completed, the Lpr transmission program 46 resets a retransmission counter to zero (ST806). Sequentially, the Lpr transmission program 46 checks whether or not the retransmission counter exceeds a retransmission counter maximum value (ST807). Here, if the result is NO, the Lpr transmission program 46 specifies the destination IP address obtained in ST802 and ST803 and a port number and tries the connection of TPC communication channel between the network scanner 2 and PC3 (ST808). In next ST809, the Lpr transmission program 46 confirms the connection of TCP communication channel. If the result is NO in ST809, processing goes back to ST807 to check the retransmission counter, thereafter the Lpr transmission program 46 tries the connection of TCP communication channel again (ST808).

In this way, the Lpr transmission program 46 tries the connection of TPC communication channel until the retransmission counter exceeds the retransmission counter maximum value. If the connection of TCP communication channel cannot be established despite such a try, the Lpr transmission program 46 ends the transmission operation error (ST810).

When confirming that the connection of TCP communication channel is normally established in ST809, the Lpr transmission program 46 prepares a control file (ST811), and transmits a control file size to PC3 (ST812) and sends a control file thereto (ST813). Thereafter, the Lpr transmission program 46 waits for ACK from PC3 (ST814) and checks whether or not ACK is sent (ST815). If the result is NO in ST815, the Lpr transmission program 46 closes the connection of TCP communication channel (ST816) and goes back to ST807, and tries the transmission of control file again.

On the other hand, if ACK is sent in ST815, the Lpr transmission program 46 transmits a destination queue name and an image file size to PC3 (ST817) and then transmits an image file thereto (ST818). After that, the Lpr transmission program 46 waits for ACK to the image file transmission from PC3 (ST819) and checks whether or not ACK is sent (ST820).

If the result is NO in ST820, the Lpr transmission program 46 closes the connection of TCP communication channel (ST816) and goes back to ST807, and tries the transmission of control file and the transmission of image file again. If ACK is sent in ST820, the Lpr transmission program 46 closes the connection of TCP communication channel (ST821) and ends processing.

Figure 9:
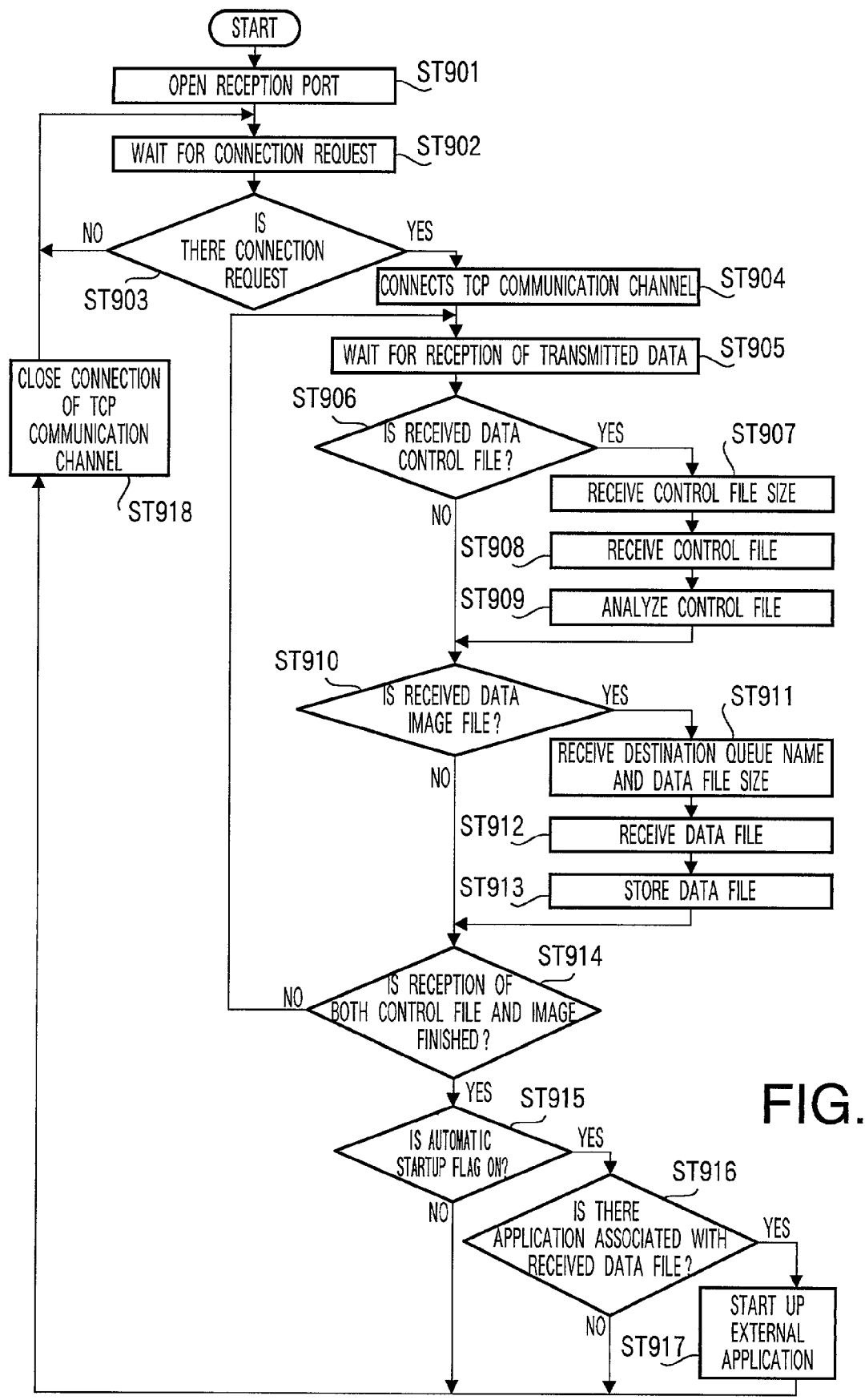
FIG. 9 is a flowchart illustrating an image file receiving operations carried out by the personal computer according to the above embodiment.

FIG. 9 is a flowchart illustrating an image file receiving operations carried out by the personal computer according to the above embodiment.

The Lpd reception program 63, which is operated on PC3, opens a reception port (ST901), and waits for a connection request from the Lpr transmission program 46 from the network scanner 2 (ST902, St903). If the connection request is sent, the Lpd reception program 63 connects the TCP communication channel (ST904) and waits for data transmission from the Lpr transmission program 46 (ST905).

If data transmission is performed, the Lpd reception program 63 determines whether or not reception data is a control file (ST906). If the result is YES, the Lpd reception program 63 receives a control file size (ST907) and then receives a control file (ST908). The received control file is sent to the control file analyzing section 71 of external application startup program 65 to be subjected to analysis (ST909).

After the control file is sent to the external application startup program 65 and when the result in ST906 is NO, the Lpd reception program 63 determines whether or not received data is the image file (ST910). If the result is YES, the Lpd reception program 63 receives the destination queue name and the image file size (ST911), and then receives the image file (ST912). The received image file is stored to the data storage 35 by the image file storage processing program 64 (ST913).

After the image file is stored and the result in ST910 is NO, the Lpd reception program 63 determines whether or not both the control file and image file are already received (ST914). If the result is NO, processing goes to ST905 and the Lpd reception program 63 waits for the reception thereof. On the other hand, if the result is YES, the link application deciding section 72 of the external application startup program 65 checks whether an application automatic startup flag 76 in RAM 33 is ON or OFF (ST915). If the result is YES, the link application deciding section 72 searches the external application managing table 74 using the extension of image file as a key, and determines whether or not there is a link application 82 associated with an extension 81 therein (ST916). If the result is YES in ST916, the link application deciding section 72 instructs the startup command output section 73 to start up the external application (ST917).

If the result is NO in ST915 and ST917, the Lpd reception program 63 disconnects the TCP communication channel (ST918) and than goes back to ST901, and waits for a next connect request.

Thus, according to the present embodiment, the image reception program 62, which is operated on PC3, receives the control file including the image file name from the network scanner 2, analyzes the received control file, and recognizes the extension 81 of the image file. Then, the Lpd reception program 63 searches the external application managing table 74 using the extension 81 of image file as a key, and decides the link application associated with this image file, and starts up the decided link application so as to open the image file. Whereby, the user just instructs the scanner 2 to specify the destination and to scan the document so that the link application is automatically decided and started up by PC3 as well as scanning of the document and transmission of the image file. Resultantly, when the user returns to the user's PC on the desk, image information is displayed on the display 36 and the user can view the document file immediately. Accordingly, after retuning to the user's PC on the desk, the user does not have to carry out such operations that the link application is selected at user's own discretion and started up, the image file sent from the network scanner 2 is searched from the data storage 35 and the searched file is opened. Consequently, this makes it possible to reduce much time and effort to carry out operations and considerably improve efficiency of the entire user's work.

Moreover, as described above, according to the present embodiment, the link application deciding section 72 searches the external application managing table 74 using the extension 81 as a key and obtains the display state 83 associated therewith. Then, the link application deciding section 72 instructs the startup command output section 73 to generate and output the startup command to which the option is set according to the display state 83. At the time of displaying the image using the link application, this makes it possible to display all image files in the image file storage is folder in the form of thumbnail even if user's operations and instructions are not provided, in addition to the point that the link application is started up to simply display image information directly.

In this example, although the link application deciding section 72 obtains the link application 82 and display state 83 as application information together, any one of information may be obtained. For example, although the display state is always constant (e.g., thumbnail display is carried out without fail) according to the image file, the present invention can be applied to the case in which only the link application is changed. In this case, for example, the option of thumbnail display is given to the startup command without fail.

Contrarily, the present invention can be applied to the case in which the link application is constant but only the display state is changed. In this case, although the startup command for starting up the link application is always the same, no option is specified in connection with a certain image file and the option of, for example, thumbnail display is provided to the startup command in connection with other kinds of image files.

The foregoing embodiment explained the network scanner 2 that transmits image information as an image file as one example. However, there may be used a network scanner, which converts image information to an electronic document format such as PDF (Portable Document Format: data format for electronic document distribution made by Adobe Systems in US) and transmits it, and a network scanner, which converts image information to text using OCR and transmits it as a non-image file such as a text file, word processor document file and the like. In this case, as illustrated in FIG. 7, PDF reader is specified as a link application in case of PDF, and text data is specified as a link application in case of text. Thus, according to the present invention, when receiving not only the image file but also the document file including such as PDF and text, PC3 can automatically select an external application, which is appropriate to the document file, and execute it.

Moreover, in the foregoing embodiment, Lpr/Lpd protocol is used to transmit/receive the image file between the network scanner 2 and PC. However, the present invention is not limited to this, and ftp protocol and the like can be used.

This invention may be conveniently implemented using a conventional general purpose digital computer or microprocessor programmed according to the teachings of the present specification, as will be apparent to those skilled in the computer art. Appropriate software coding can readily be prepared by skilled in programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

As explained above, according to the present invention, when receiving the document file, the user terminal apparatus automatically starts up the external application corresponding to the document file so as to display the document file. This provides such an effect that the user's operations such as the startup of external application and the selection of document file can be omitted to make it possible for the user to view the document file extremely easily and quickly.

The present invention is not limited to the above described embodiment, and various variations and modifications may be possible without departing from the scope of the present invention.

This application is based on the Japanese Patent Application No. 2001-26745 filed on Feb. 2, 2001, entire content of which is expressly incorporated by reference herein.

What is claimed is:

1. A terminal apparatus configured to receive image data from a scanner, the terminal apparatus comprising:
   an interface configured to be connected to the scanner via a network;
   a memory configured to store information indicating a plurality of file types and an application program associated with each of the plurality of the file types, each application program being configured to open a document file associated with at least one of the plurality of the file types; and
   a controller configured to:
      receive, from the scanner, a control file including a file name;
      receive, from the scanner, the document file, the document file including image data scanned by the scanner;
      analyze the file name included in the received control file to obtain the file type of the received document file;
      determine whether the application program associated with the obtained file type is stored in the memory;
      search the memory to determine the application program associated with the obtained file type from the application programs stored in the memory;
      start the application program associated with the obtained file type, when it is determined that the application program associated with the obtained file type is stored in the memory; and
      open the received document file without user input, based upon the application program determined in the search.

2. The terminal apparatus according to claim 1, wherein the controller receives, from the scanner, the control file and the document file, according to a Lpr/Lpd protocol.

3. The terminal apparatus according to claim 1, wherein the controller displays the image data included in the document file on a display of the terminal apparatus, in the form of thumbnail.

4. The terminal apparatus according to claim 1, wherein the memory stores a plurality of display states associated with the information indicating the plurality of the file types, and the controller displays the image data included in the document file on a display of the terminal apparatus, based on the display state associated with the obtained file type.

5. The terminal apparatus according to claim 4, wherein the display state comprises displaying the image data in the form of a thumbnail.

6. The terminal apparatus according to claim 1, wherein the interface is configured to be connectable to each of a plurality of scanners via a network, and the controller is configured to receive, from one of the plurality of the scanners, a control file including a file name and to receive, from the one of the plurality of the scanners, a document file, the document file including image data scanned by the scanner.

7. The terminal apparatus according to claim 1, the controller being further configured to determine whether data received from the scanner comprises a control file and a document file, and when the controller determines that the received data includes the control file and the document file, to search the memory.

8. The terminal apparatus according to claim 1, wherein the memory stores file extensions with associated application programs and associated display states, the control file received from the scanner including a file extension.

9. The terminal apparatus according to claim 8, the controller being configured to utilize the file extensions to search the memory for the associated application program.

10. The terminal apparatus according to claim 1, the controller being configured to determine which application program to start, based upon data stored in memory, without user input.

11. The terminal apparatus according to claim 1, wherein the controller closes the connection with the scanner without opening the received document file, when it is determined that the application program associated with the obtained file type is not stored in the memory.

12. A network system, comprising:
    a scanner configured to scan image data; and
    a terminal apparatus configured to be connected to the scanner via a network, and to store, in a memory, information indicating a plurality of file types and an application program associated with each of the plurality of the file types, each application program being configured to open a document file associated with at least one of the plurality of the file types,
    the terminal apparatus being further configured to:
       receive, from the scanner, a control file including a file name;
       receive, from the scanner, the document file, the document file including image data scanned by the scanner;
       analyze the file name included in the received control file to obtain the file type of the received document file;
       determine whether the application program associated with the obtained file type is stored in the memory;
       search the memory to determine the application program associated with the obtained file type from the stored application programs;
       start the application program associated with the obtained file type, when it is determined that the application program associated with the obtained file type is stored in the memory; and
       open the received document file without user input, based upon the application program determined in the search.

13. The terminal apparatus according to claim 12, the controller being further configured to determine whether data received from the scanner comprises a control file and a document file, and when the controller determines that the received data includes the control file and the document file, to search the memory.

14. The terminal apparatus according to claim 12, wherein the memory stores file extensions associated with application programs and with associated display states, the control file received from the scanner including a file extension.

15. The terminal apparatus according to claim 14, the controller being configured to utilize the file extensions to search the memory for the associated application program.

16. The terminal apparatus according to claim 12, the controller being configured to determine which application program to start, based upon data stored in memory, without user input.

17. A communication method for receiving image data scanned by a scanner, using a terminal apparatus connected to the scanner via a network, the terminal apparatus storing, in a memory, information indicating a plurality of file types and an application program associated with each of the plurality of the file types, each application program being configured to open a document file associated with at least one of the plurality of the file types, the communication method comprising:

receiving, from the scanner, a control file including a file name;

receiving, from the scanner, document file, the document file including image data scanned by the scanner;

analyzing the file name included in the received control file to obtain the file type of the received document file; and determining whether the application program associated with the obtained file type is stored in the memory;

searching the memory of the terminal apparatus to determine the application program associated with the obtained file type from the application programs stored in the memory;

starting the application program associated with the obtained file type, when it is determined that the application program associated with the obtained file type is stored in the memory; and opening the received document file without user input, based upon the application program determined in the searching determined in the search.

18. The communication method according to claim 17, further comprising determining whether data received from the scanner comprises a control file and a document file, and when the received data is determined to include the control file and the document file, searching the memory.

19. The communication method according to claim 17, further comprising storing file extensions with associated application programs and with associated display states, the control file received from the scanner including a file extension.

20. The communication method according to claim 19, further comprising utilizing the file extensions to search the memory for the associated application program.

21. The communication method according to claim 17, further comprising determining which application program to start, based upon data stored in memory, without user input.

* * * * *